Aug. 21, 1923.
F. A. HIGGINS
VELOCIPEDE
Filed April 4, 1922
1,465,435
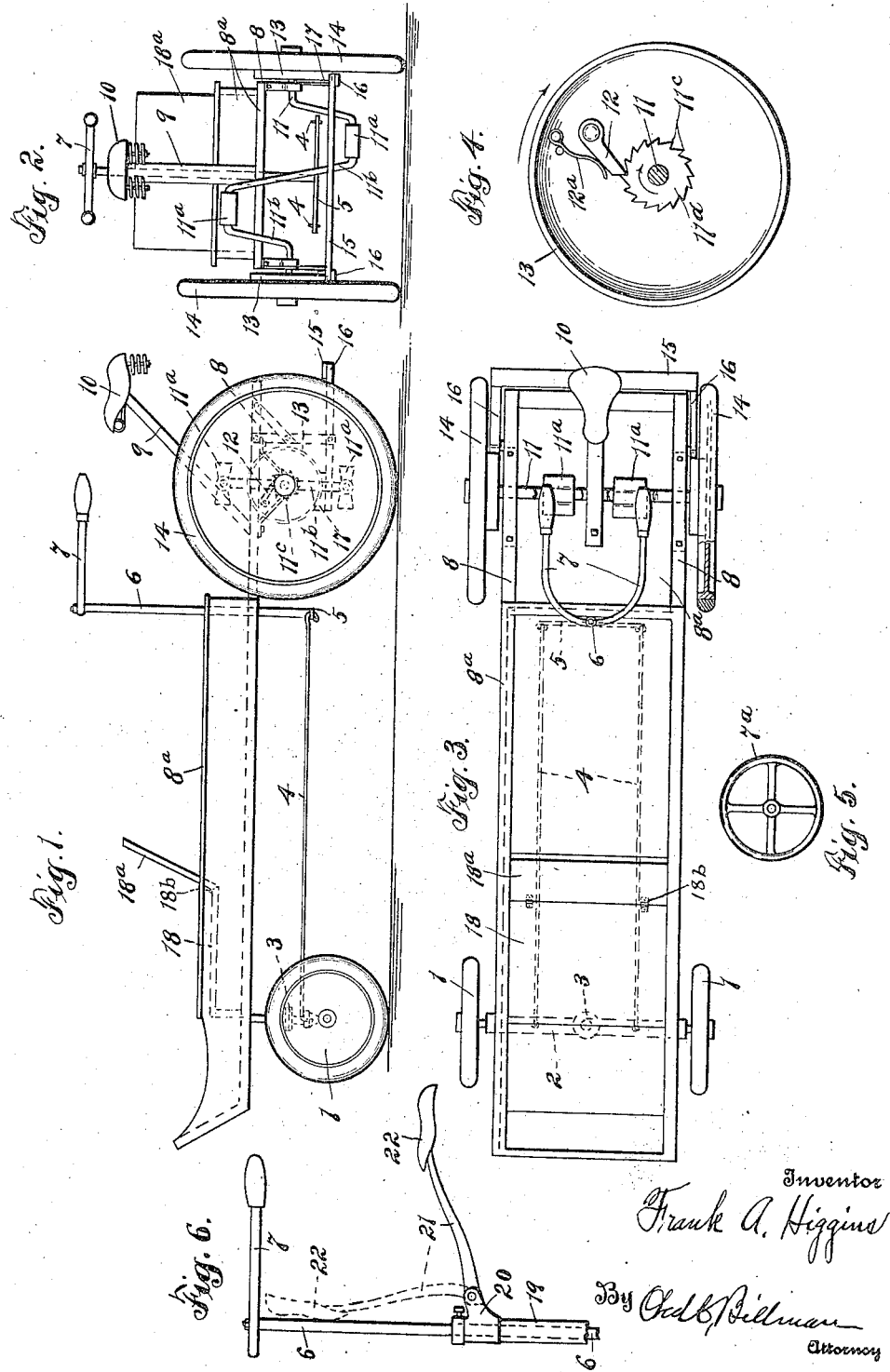

Patented Aug. 21, 1923.

1,465,435

UNITED STATES PATENT OFFICE.

FRANK A. HIGGINS, OF BELLEVUE, OHIO.

VELOCIPEDE.

Application filed April 4, 1922. Serial No. 549,440.

*To all whom it may concern:*

Be it known that I, FRANK A. HIGGINS, a citizen of the United States, residing at Bellevue, in the county of Huron and State of Ohio, have invented certain new and useful Improvements in Velocipedes, of which the following is a specification.

My invention relates to improvements in velocipedes, the present embodiment of the invention being particularly designed and adapted for the use of children as a self-propelled vehicle adapted to closely simulate an automobile in general outline and its steering mechanism.

The primary object of the invention is to provide a generally improved vehicle of the type or class indicated which will be exceedingly simple in construction, cheap of manufacture, and efficient in use.

A further and very important object is the provision of an improved vehicle for the amusement of children having improved foot controlled driving and brake mechanism of simple character which will be durable and efficient and not liable to damage or disarrangement in use.

There are other features of the invention residing in elemental combinations and particular construction of parts, all as will hereinafter more fully appear.

With the above mentioned and other ends in view, the invention consists in the novel construction, arrangement and combination of parts, hereinafter described, illustrated in one of its embodiments in the accompanying drawings, and particularly pointed out in the appended claims.

Referring to the drawings, forming a part of this specification, Figure 1 is a side elevation of a vehicle of the velocipede type constructed in accordance with this invention.

Fig. 2, a rear elevation of the same.

Fig. 3, a top plan view of the same.

Fig. 4, an enlarged side elevation of the inner portion of one of the brake drums and a pawl and ratchet driving mechanism arranged to be driven and controlled by the pedal carrying wheel driving transversely extending crank shaft.

Fig. 5, a top plan view of a steering wheel which may be used on the steering column in lieu of the handle bars.

Fig. 6, a side elevation of a modified form of seat or saddle and means of mounting the same.

Similar numerals of reference designate like parts throughout all the figures of the drawings.

It will be seen that the improved velocipede is of the four wheel type, the front wheels being used for steering and the rear wheels being used as driving or traction wheels.

The vehicle chassis and the body may be of any suitable and convenient form but preferably of an outline simulating that of an automobile.

The front or steering wheels 1, may be mounted on an ordinary cross axle 2, extending transversely beneath the front of the chassis frame and provided with a fifth wheel 3, whereby the front wheels 1 may be steered through the medium of the axle 2 and connecting rods 4, leading to a rear cross bar 5, carried on the lower end of a steering shaft 6, the latter being provided at its top with a suitable steering head, such for example, as handle bars 7, or if desired a steering head in the specific form of an ordinary steering wheel $7^a$, may be substituted and used.

As a means of driving the vehicle through the medium of the feet of the operator, the vehicle body $8^a$, carried by the chassis side bars 8, may be provided with an upwardly and rearwardly extending seat supporting bar 9, carrying the saddle 10. The rider or operator while seated in the saddle 10 places the feet on the pedals $11^a$, on the crank arms $11^b$, of the rear or transversely extending axle shaft 11, the ends of the axle or crank shaft 11 being provided with forwardly tapered or inclined teeth $11^c$, of the ratchet gears $11^d$, the latter being adapted to engage the pawls 12, pivotally arranged within the brake drums 13, the latter being arranged within the sides of the driving wheels 14. The pawls 12 are preferably held in proper relative positions to the ratchet gears $11^d$ by means of springs $12^a$, as shown most clearly in Fig. 4 of the drawings.

By this arrangement it will be understood that as the crank axle shaft 11 is rotated forwardly through the pedals $11^a$, the teeth of the ratchet gears $11^d$ will engage the pawls 12 and thus drive the driving or traction wheels 14 forwardly, but if at any time, should the operator so desire, the operator may hold the crank shaft 11 in a stationary position and thus permit the driving wheels to move forwardly and independently (the pawl and ratchet arrangement permitting of this movement) as in coasting or the like.

As a means of bringing the vehicle to a sudden stop the operator may place the feet upon the cross bar 15, carried at the rear ends of the levers 16, the latter being provided with brake shoes 17, to frictionally engage the exterior portions of the brake drums 13.

The front of the vehicle may be provided with a seat 18, for one or more extra passengers and, if desired, said seat may be provided with a folding back 18ª, which, in the present instance, is provided with hinge members 18ᵇ, so that the back may be folded forwardly upon the horizontally extending seat when the front seat is not to be occupied and it is desired to carry any articles in the front.

If desired the steering shaft 6 may extend upwardly through a relatively fixed bearing member or column 19, as shown in Fig. 6 of the drawings, in which instance the relatively fixed column 19 may be provided with an adjustably mounted bearing clamp 20, adapted to support a hingedly connected upwardly foldable seat supporting lever 21, so that the seat or saddle 22, may be folded up when not in use.

Having thus described embodiments of my invention, without having attempted to set forth all the forms in which it may be made, or all the modes of its use, what I claim and desire to secure by Letters Patent is,—

1. In a velocipede, a vehicle chassis, a transverse steering axle below the front of said chassis provided with steering wheels, a pedal carrying driving shaft beneath the rear of said chassis provided with ratchet gears, driving wheels loosely mounted on said driving shaft and provided with brake drums carrying pawls, said ratchet gears on said shaft being surrounded by said brake drums and being adapted to engage said pawls when said driving shaft is moved forwardly and to release said pawls and permit coasting when said shaft is brought to a stop, a saddle above said pedal carrying driving shaft, and steering mechanism in operative proximity to said saddle operatively connected to said front steering axle.

2. In a velocipede, a vehicle chassis frame, a transverse steering axle at the front of said frame provided with steering wheels, a pedal carrying driving shaft at the rear of said frame provided with ratchet gears, driving wheels loosely mounted on the ends of said driving shaft and provided with brake drums carrying pawls, said ratchet gears on said shaft being surrounded by said brake drums and being adapted to engage said pawls when said driving shaft is moved forwardly and to release said pawls and permit said wheels to move independently when said shaft is brought to a stop or is moved rearwardly, a saddle above said pedal carrying driving shaft, and steering mechanism in operative relation to said saddle connected to said front steering axle.

In testimony whereof I have affixed my signature.

FRANK A. HIGGINS.